United States Patent [19]

Stern

[11] 4,075,009

[45] Feb. 21, 1978

[54] NICKEL BASE BRAZING ALLOY

[75] Inventor: Marvin J. Stern, Seattle, Wash.

[73] Assignee: Alloy Metals, Inc., Troy, Mich.

[21] Appl. No.: 681,957

[22] Filed: Apr. 30, 1976

[51] Int. Cl.$^2$ ............................................. C22C 19/03
[52] U.S. Cl. ..................................................... 75/170
[58] Field of Search .................... 75/170, 171; 148/32, 148/32.5

[56] References Cited

U.S. PATENT DOCUMENTS 2,856,281  10/1958  Cremer et al. ........................ 75/170

*Primary Examiner*—R. Dean
*Attorney, Agent, or Firm*—Cullen, Settle, Sloman & Cantor

[57] ABSTRACT

A nickel base, relatively low temperature brazing alloy, particularly suitable for brazing, carbon and low alloy steels, nickel base alloys, copper alloys and stainless steels, (including thin sections, eg. honeycomb) in dry-hydrogen or inert atmospheres and in partial-pressure or high vacuums. The brazing alloy is also suitable for brazing in "wet" endothermic and dissociated ammonia atmospheres. The brazing alloy consists essentially of, by weight, about 19 to 23 percent manganese, 5 to 8 percent silicon, 4 to 6 percent copper, 0.6 to 1.8 percent boron, 0.01 to 0.2 percent rare earth, preferably mischmetal, additions of up to 3 percent tantalum, molybdenum, columbium, tungsten, and aluminum, under 0.03 percent carbon and the balance nickel. The brazing alloys of this invention will braze below 1850° F, permit multiple braze cycles without remelting and provide joint service temperature to 1700° F.

10 Claims, No Drawings

NICKEL BASE BRAZING ALLOY

FIELD OF THE INVENTION

The brazing alloys of this invention are particularly, although not exclusively, adapted for brazing or low temperature diffusion-welding carbon and low alloy steels, nickel base alloys, copper alloys and stainless steels, including difficult brazing applications such as brazing honeycomb components, fiber-metal turbine rub-seal etc. The brazing alloy of this invention may be utilized to braze dissimilar metal joints of these materials. The brazing alloy of this invention may also be used in powder metal joining and other industrial applications utilizing "wet" endothermic and dissociated ammonia atmospheres.

Gold-nickel alloys have been suggested as low temperature brazing alloys, however the cost of gold has made such brazing alloys relatively unsuitable commercially. Further, gold-nickel alloys are very sensitive to thin section erosion and joint properties deteriorate within service temperatures over 700°-1000° F. Nickel base brazing alloys having a relatively high percentage of manganese, about 23 percent, have also been suggested, however the commercial form of such brazing alloys have a brazing temperature between 1870° to 2000° F. An object of the present invention is therefore to lower the brazing temperature of such brazing alloys. Nickel-phosphorus and nickel-chromium-phosphorus alloys have also been suggested by the prior art, however such alloys are limited because of their brittleness, erosion of thin sections and poor resistance to corrosion and tendency to remelt in multiple braze cycles. In addition, brazing of large, one-piece, 360° honeycomb structures has been handicapped by a tendency for all these alloys to cause erosion and non-uniform braze fillers due to their characterizing gravity-migration.

U.S. Pat. No. 2,856,281 of Kremer discloses a nickel-manganese, relatively high temperature brazing alloy. The brazing alloys disclosed in the Kremer patent have not been successful commercially for many applications because the brazing temperature is too high and the alloys have not been successful for multiple braze cycles, without remelting. Further, the commercial alloys can not be used for ultra-thin sections, eg. 0.002 inches or less, and industrial furnace applications requiring "wet" endothermic and dissociated ammonia atmospheres. The brazing alloy of this invention includes a relatively narrow range of nickel-manganese-silicon-copper alloys, which alloys were developed to solve these particular problems of the prior art.

SUMMARY OF THE INVENTION

The nickel base brazing alloy and method of this invention permits the brazing of carbon and low alloy steels, nickel base alloys, copper alloys, and stainless steels at relatively low temperatures, peferably less then 1850° F. The improved brazing alloy of this invention results in a relatively clean brazed joint having an excellent microstructure and shear strength. Brazing may be performed either in reducing atmosphere, such as hydrogen; or partial-pressure vacuum in inert atmosphere, such as argon or helium or in "hard" vacuum. Suprisingly, the brazing alloy of this invention may also be used in industrial furnace applications requiring "wet" endothermic and dissociated ammonia atmospheres.

The brazing alloy of this invention consists essentially of, by weight the following composition:

| Material | Percent, by weight |
| --- | --- |
| manganese | 19–23 |
| silicon | 5–8 |
| copper | 4–6 |
| boron | 0.6–1.8 |
| rare earth | 0.01–0.2 |
| tantalum | 0–3 |
| molybdenum | 0–3 |
| columbium | 0–3 |
| tungsten | 0–3 |
| aluminum | 0–3 |
| carbon | .06 max. |
| nickel | balance |

The most preferred composition of the nickel base brazing alloy of this invention comprises, by weight 19 to 20 percent manganese, 5.5 to 6.5 percent silicon, 4 to 6 percent copper, 0.7 to 1.2 percent boron, 0.02 to 0.1 percent rare earth, preferably mischmetal 0.02 percent carbon and the balance nickel.

The brazing alloy of this invention may be utilized for multiple braze cycles without remelting and for relatively thin sections, such as honeycomb and heat exchanger components having a thickness of 0.002 inches or less. The brazed joints are relatively duchle have a high shear strength and an improved fine-grain microstructure. The alloy responds to post-braze homusenizing treatments and is uniquely capable of service temperatures of 1600° F to 1700° F although brazed at temperatures of 1780°-1825° F. In addition the combination of magnanese, boron and rare earth covered by this patent provides a unique nickelbase braze alloy capable of brazing large 360°/1-piece honeycomb structures with uniform braze fillets both top and bottom as the alloy is not subject to "alloy migration" and erosion problems common to most other braze alloy systems.

The method of this invention then includes assembling the metal parts to be joined, which may be carbon or low alloy steels, nickel base alloys, copper or various stainless steels, applying the preferred brazing alloy, which may be in the form of a paste, powder, tape or foil and heating the parts to be joined below the melting temperature of the parts and above the melting temperature of the brazing alloy. In the preferred embodiment of this invention, the brazing temperature is less than 1850° F, generally between about 1750° F and 1850° F. As described, the method of this invention may be performed in pure, dry-hydrogen or inert atmospheres or in partial pressures or in a high vacuum. Also, the brazing alloy of this invention may be utilized in powder metal joining and other industrial applications utilizing "wet" endothermic and dissociated ammonia atmospheres.

Other advantages and meritorous features of the present invention will be more fully understood from the following description of the preferred brazing alloy and method and the appended claims.

DESCRIPTION OF THE PREFERRED BRAZING ALLOY AND METHOD

The preferred nickel base brazing alloy of this invention may be formed by induction melting of the elemental constituents, forming a homogneous alloy. The alloy may also be formed into foil or wire. Alternatively, the brazing alloy of this invention may be melted and atomized into a powder or ball milled. The brazing alloy may then be applied directly to the parts to be joined and heated or the metal alloy may be applied in a paste form, wherein the paste includes a volatile organic carrier.

The basic composition of the nickel base brazing alloy of this invention includes, by weight, 19 to 23 percent manganese, 5 to 8 percent silicon, 4 to 6 percent copper, 0.6 to 1.8 percent boron, 0.01 to 0.2 percent rare earth, up to 3 percent of certain additives including tantalum, molybdenum, columbium, tungsten and aluminum, with the balance being nickel. It will be understood that the brazing alloy of this invention may also include certain impurities or contaminants, eg. up to about 0.03 percent carbon, which will not affect the brazing alloy or method in most applications. As described, the nickel base or nickel-manganese base brazing alloy of this invention is particularly suitable for brazing carbon and low alloy steel, nickel alloys, copper alloy and stainless steel, wherein the brazing temperature is preferably less than 1850° F. The brazing alloy of this invention was particularly, although not exclusively developed to permit brazing of nickel alloy 718, A151-410 and Greek Ascoloy stainless steels at their 1775-1825 solution and austenitizing temperatures.

The preferred composition of the alloy of this invention comprises, by weight, 19 to 20 percent manganese, 5 to 8 percent silicon, 4 to 6 percent copper, 0.6 to 1.8 percent boron, 0.04 to 0.2 percent rare earth, preferably mischmetal and the balance nickel. The brazing alloys of the preferred composition will braze at between 1800° and 1850° F. The most preferred composition includes, by weight, about 19 percent manganese, 5 to 6 percent silicon, 4 to 6 percent copper, 0.85 percent boron, 0.08 rare earth, under 0.02 percent carbon with the balance nickel.

It has been found that the combination of manganese, rare earth and boron in a nickel base brazing alloy having silicon and copper in the preferred ranges set forth above results in an improved brazing alloy suitable for brazing nickel base alloys, copper and stainless steel at brazing temperatures less than 1850° F. The resultant reduction in the brazing temperature also increases the applications for such brazing alloys to include carbon steels and low alloy. The brazing alloys of this invention results in a very clean brazed joint having improved grain or microstructure and high shear strength. As stated above, the brazing alloy of this invention is preferably brazed under high vacuum and inert atmospheres, however, the brazing alloy may also be utilized in industrial applications, such as powder metal joining, requiring "wet" endothermic and dissociated ammonia atmospheres.

The combination of nickel and manganese forms a solid solution alloy, but (previous melting point-depressants used by others in this alloy system) such alloys have not been practical for brazing alloys because of brittleness and erosion characteristics of the brazing alloy and the relatively high brazing temperature. Silicon has been added to certain brazing alloys to lower the brazing temperature, however the brazed joint utilizing a nickel-manganese-silicon alloy is still too brittle and erosive for many applications and the brazing temperature remains high. Copper has also been added by other investigators in nickel base brazing alloys to reduce the brazing temperature and improve the fluidity of the alloy, however the brazing temperature remains too high for brazing many base metals. It has now been found in the brazing alloy of this invention that the controlled addition of boron and rare earth to a nickel-manganese base brazing alloy in the limited range of this invention results in an improved brazing alloy having a reduced brazing temperature suitable for brazing carbon and low alloy steels, nickel base alloys, copper and base alloys and stainless steels.

Silicon in the brazing alloy of this invention serves as a temperature suppressent. It has further been found that concentrations of silicon of less than about 5 percent results in brazing temperatures which are too high for the preferred applications, and concentrations of silicon above about 8 percent also results in an increase in the brazing temperature. Further, the brazing alloy becomes too brittle for many applications. Copper also serves as a temperature suppressent in the brazing alloy of this invention, however copper is added primarily to add fluidity to the alloy. Concentrations of copper under about 3 percent results in a brazing alloy which is too viscous for many applications and a brazing temperature above the preferred limit. Similarly, a concentration of copper greater than 7 or 8 percent increases the brazing temperature.

The concentration of boron is preferably less than 2 percent. Boron also serves as a temperature suppressent and strength energy. Rare earth has been added to the brazing alloy of this invention, primarily to serve as a scavenger or "getter" deoxidizing the melt and to promote wettability while enhancing the elerated temperature properties and toughness of the brazed joint. Rare earths in the brazing alloy of this invention also serve as a temperature depressent and provides a finer grain in the brazed joint, improving the microstructure, the toughness and shear strength of the brazed joint. Some of the suitable rare earths include lanthanum, praseodymium, neodymium yttrium and misch-metal. The elemental rare earths may be used in either the refined or oxide form. Mischmetal, which is utilized in the most preferred embodiment of the brazing alloy of this invention, is a naturally accuring rare earth including about 40 to 75 percent by weight cerium and various amounts of lanthanum, neodymium and praseodymium. One analysis of mischmetal included 53 to 56 percent by weight cerium, 24 percent by weight lanthanum, 10 to 15 percent neodymium and further trace elements.

The following examples illustrate the nickel base brazing alloy of this invention. In each example, the elemental metals were heated by conventional induction melting techniques, forming a homogenius metal alloy. The brazing alloy was then applied to the surfaces of the parts to be brazed and then brazed, in either a hard vacuum, an inert atmosphere or "wet" endothermic or dissociated ammonia atmospheres. The brazing alloy formed an excellent bond between the metal parts. As stated above, the preferred or recommended brazing temperature for the brazing alloys of this invention is 1850° F or less, with an optimum retention, fine grain structure and ductility and avoidance of notch stress-rupture problems resulting from greater temperatures. In addition, the brazing alloy of this invention permits rebrazing from three to five times without melting of the original braze and the brazing alloy will permit service to 1600°-1700° F with suitable base metals. The brazes may be Tig, Mig or Plasma needle arc repaired.

| Material | Percent by weight |
|---|---|
| Example 1 | |
| manganese | 19 |
| silicon | 6 |
| copper | 5 |
| boron | 0.85 |
| mischmetal | 0.08 |

| Material | Percent by weight |
|---|---|
| carbon | 0.02 |
| nickel | Balance |
| Example 2 | |
| manganese | 20 |
| silicon | 5.5 |
| copper | 5 |
| boron | 1.5 |
| rare earth (lanthanum) | 0.2 |
| carbon | 0.03 |
| aluminum | 2 |
| nickel | Balance |
| Example 3 | |
| manganese | 19 |
| silicon | 6.2 |
| copper | 4.7 |
| boron | 0.9 |
| mischmetal | 0.05 |
| tantalum | 2.5 |
| molybdenum | 2.0 |
| columbium | 1.5 |
| nickel | Balance |
| Example 4 | |
| manganese | 20 |
| silicon | 6.5 |
| copper | 4 |
| boron | 1 |
| rare earth (yttrium) | 0.08 |
| nickel | Balance |
| Example 5 | |
| manganese | 19 |
| silicon | 6.2 |
| copper | 4.7 |
| boron | 0.9 |
| mischmetal | 0:05 |
| tantalum | 2.5 |
| molybdenum | 2.0 |
| columbium | 1.5 |
| nickel | Balance |
| Example 6 | |
| manganese | 19.5 |
| silicon | 6.5 |
| copper | 5.2 |
| boron | 0.75 |
| rare earth (lanthanum) | 0.01 |
| tungsten | 0.75 |
| nickel | Balance |
| Example 7 | |
| manganese | 19 |
| silicon | 7.4 |
| copper | 5.8 |
| boron | 1.5 |
| rare earth (mischmetal) | 0.08 |
| nickel | Balance |
| Example 8 | |
| manganese | 22.7 |
| silicon | 6.3 |
| copper | 4.6 |
| boron | 1.48 |
| mischmetal | 0.079 |
| nickel | Balance |
| Example 9 | |
| manganese | 20 |
| silicon | 6 |
| copper | 4.5 |
| boron | 1 |
| mischmetal | 0.08 |
| nickel | Balance |
| Example 10 | |
| manganese | 21 |
| silicon | 6.3 |
| copper | 4.6 |
| boron | 1.4 |
| mischmetal | 0.075 |
| carbon | 0.009 |
| nickel | Balance |
| Example 11 | |
| manganese | 19 |
| silicon | 7.4 |
| copper | 5.8 |
| boron | 1.6 |
| mischmetal | 0.08 |
| carbon | 0.011 |
| nickel | Balance |

The reduction in the brazing temperature is evidenced by a reduction in the liquidus and solidus temperatures of the alloys. For examples, the solidus temperature for the alloys described in the Kremer patent, supra, ranged from 1800° to 1840° F and the liquidus ranged from 1840° to 1880° F. In the alloys of examples 1 and 7, the solidus was measured at 1571° F and the liquidus was 1646° F. In the alloy of Example 8, the solidus was measured at 1573° F and the liquidus was 1767° F. Similarly, the solidus temperature of the alloy of example 10 was measured at 1657° to 1670° F and the liquidus was between 1755° to 1760° F.

The method of joining metal parts of this invention then includes applying the brazed alloy of the invention to the parts to be joined adjacent the contacting surfaces. As stated above, the brazing alloy may be in the form of a metal powder, foil or wire or the brazing alloy may be applied in the form of a paste. The metal parts to be joined are preferably carbon and low alloy steels, nickel base alloys, copper alloys, and stainless steel or combinations thereof. The parts including the brazing alloys will then be heated, preferably in a suitable furnace, having an inert atmosphere or a vacuum furnace. Further, as described above, the alloy may be used in powder metal joining and other industrial applications utilizing "wet" endothermic and dissociated ammonia atmospheres. The heat of the furnace then results in a brazed joint having excellent physical properties, including shear strength and excellent microstructure. It will be understood however that the brazing alloy of this invention may also be used for other applications, including low carbon steel, etc.

Having fully described the brazing alloy and method of this invention, I now claim:

1. A low temperature brazing alloy particularly suitable for brazing carbon and low alloy steels, nickel alloys, copper alloys and stainless steels, consisting essentially of, by weight,
   manganese: 19 to 23%
   silicon: 5 to 8%
   copper: 4 to 6%
   boron: 0.6 to 1.8%
   rare earth: 0.01 to 0.2%
   tantalum: 0 to 3%
   molybdenum: 0 to 3%
   columbium: 0 to 3%,
   tungsten: 0 to 3%
   aluminum: 0 to 3%
   carbon: up to 0.06%
   nickel: Balance 2. The brazing alloy defined in claim 1, wherein the concentration of manganese is about 19 to 20 percent by weight.

3. The brazing alloy defined in claim 2, wherein the concentration of boron is 0.7 to 1.2 percent, by weight, the concentration of rare earth is approximately 0.08 percent by weight, and the brazing temperature of the alloy is less than 1850° F.

4. The brazing alloy defined in claim 3, wherein said rare earth is mischmetal.

5. A relatively low temperature nickel base brazing alloy, particularly suitable for brazing carbon and low alloy steels, nickel base alloys, copper alloys and steel, consisting essentially of, by weight,
   manganese: 19 to 20%
   silicon: 5.5 to 6.5%
   copper: 4 to 6%
   boron: 0.7 to 1.2%
   rare earth: 0.02 to 0.1%
   tantalum: 0 to 3%
   molybdenum: 0 to 3% columbium: 0 to 3%
tungsten: 0 to 3%
aluminum: 0 to 3%
nickel: Balance

6. The brazing alloy defined in claim 5, wherein said rare earth is mischmetal.

7. The brazing alloy defined in claim 6, wherein the concentration of manganese is substantially about 19 percent, by weight, the concentration of boron is 0.85 to 1 percent, by weight, and the concentration of rare earth is about 0.08 percent, by weight, and the brazing alloy has a brazing temperature of less than about 1850° F.

8. A relatively low temperature nickel base brazing alloy particularly suitable for brazing carbon and low alloys, nickel alloys, copper alloys and stainless steels, consisting essentially of, by weight,
manganese: 19%
silicon: 5–6%
copper: 4–6%
boron: 0.85%
mischmetal: 0.08%
carbon: up to 0.02%
nickel: Balance 9. A relatively low temperature nickel base brazing alloy, particularly suitable for brazing carbon and low alloy steels, consisting essentially of, by weight, 19 to 23 percent manganese, 5 to 8 percent silicon, 4 to 6 percent copper, 0.6 to 1.8 percent boron, 0.01 to 0.2 percent rare earth, up to 3 percent tantalum, molybdenum, columbium, tungsten and aluminum, with the balance being nickel.

10. A relatively low temperature brazing alloy, consisting essentially of, by weight 19 to 20 percent manganese, 5 to 8 percent silicon, 4 to 6 percent copper, 0.6 to 1.8 percent boron, 0.04 to 0.2 percent rare earth and the balance nickel.

* * * * *